US009131502B2

(12) United States Patent
Li et al.

(10) Patent No.: US 9,131,502 B2
(45) Date of Patent: Sep. 8, 2015

(54) METHOD AND APPARATUS FOR CONTENTION BASED UPLINK TRANSMISSION

(71) Applicant: Huawei Technologies Co., Ltd., Shenzhen (CN)

(72) Inventors: Chaojun Li, Shenzhen (CN); Lei Guan, Shenzhen (CN); Yongxia Lv, Shenzhen (CN); Wei Quan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 13/718,502

(22) Filed: Dec. 18, 2012

(65) Prior Publication Data

US 2013/0107838 A1   May 2, 2013

Related U.S. Application Data

(63) Continuation of application No. PCT/CN2011/075384, filed on Jun. 7, 2011.

(30) Foreign Application Priority Data

Jun. 18, 2010   (CN) .......................... 2010 1 0213309

(51) Int. Cl.
*H04W 72/04* (2009.01)
*H04W 74/08* (2009.01)
*H04W 74/00* (2009.01)

(52) U.S. Cl.
CPC ........ *H04W 72/0453* (2013.01); *H04W 74/008* (2013.01); *H04W 74/0866* (2013.01)

(58) Field of Classification Search
CPC .......... H04W 72/0453; H04W 74/008; H04W 74/0866
USPC .......... 370/329, 330, 338, 347; 455/436, 438, 455/439, 502, 446, 442
See application file for complete search history.

(56) References Cited

U.S. PATENT DOCUMENTS

| 8,767,644 B2 * | 7/2014 | Wager et al. ................... 370/329 |
| 2010/0034162 A1 | 2/2010 | Ou et al. |
| 2010/0111029 A1 | 5/2010 | Chou et al. |

FOREIGN PATENT DOCUMENTS

| CN | 101076185 A | 11/2007 |
| CN | 101715237 A | 5/2010 |

(Continued)

OTHER PUBLICATIONS

Office Action issued in corresponding Chinese Patent Application No. 201010213309.0, mailed May 6, 2013, 36 pages.

(Continued)

*Primary Examiner* — Chandrahas Patel
(74) *Attorney, Agent, or Firm* — Brinks Gilson & Lione

(57) ABSTRACT

A method and related apparatuses for Contention Based (CB) uplink transmission are provided by the present invention. And the method includes: configuring CB user group numbers and configuring a same CB Radio Network Temporary Identifier (CB-RNTI) for multiple CB user groups; for the multiple CB user groups having the same CB-RNTI, configuring a same CB Grant. With the present invention, it is not necessary to send a CB Grant for every CB user group, so that the resource overhead for CB Grant transmission is reduced, and thus the occurring probability of scheduling blocking is reduced.

26 Claims, 7 Drawing Sheets

(56) References Cited

FOREIGN PATENT DOCUMENTS

| CN | 101827425 A | 9/2010 |
|---|---|---|
| WO | WO 2010/057540 A1 | 5/2010 |
| WO | WO 2011/043709 A1 | 4/2011 |
| WO | WO 2011/086525 A1 | 7/2011 |
| WO | WO 2011/120443 A1 | 10/2011 |

OTHER PUBLICATIONS

International Search Report issued in corresponding PCT Patent Application No. PCT/CN2011/075384, mailed Sep. 22, 2011.
Written Opinion of the International Searching Authority issued in corresponding PCT Patent Application No. PCT/CN2011/075384, mailed Sep. 22, 2011.
MediaTek, "Discussion on Operations of Contention-based Transmission" Agenda Item 7.1.1.2, 3GPP TSG-RAN WG2 Meeting #69bis. Beijing, China, Apr. 12-16, 2010. R2-102208.
CATT, "The Solution of the Contention Based Uplink Transmission" Agenda Item 7.3, 3GPP TSG RAN WG2 Meeting #70. Montreal, Canada, May 10-14, 2010. R2-102803.
Extended European Search Report issued in corresponding European Patent Application No. 11795154.1, mailed Jul. 17, 2013, 16 pages.
ZTE, "Discussion on Contention Resolution of CB Transmission" Agenda Item 7.2, 3GPP TSG RAN WG2 #69. San Francisco, USA, Feb. 22-26, 2010, 4 pages.
Samsung, "On Contention Based Access" Agenda Item 7.2, 3GPP TSG-RAN2#69 meeting. San Francisco, U.S., Feb. 22-26, 2010, 3 pages.

\* cited by examiner

METHOD AND APPARATUS FOR CONTENTION BASED UPLINK TRANSMISSION

CROSS-REFERENCE TO RELATED APPLICATIONS

This application is a continuation of International Application No. PCT/CN2011/075384, filed on Jun. 7, 2011, which claims priority to Chinese Patent Application No. 201010213309.0, filed on Jun. 18, 2010, both of which are hereby incorporated by reference in their entireties.

FIELD OF TECHNOLOGY

Embodiments of the present invention relate to Long Term Evolution system, and particularly, to a method, a configuration method and a related apparatus for contention based uplink transmission.

BACKGROUND

In a Long Term Evolution (Long Term Evolution (LTE)) system, a User Equipment (User Equipment (UE)) needs to acquire Downlink Control Information (Downlink Control Information (DCI)) configured by an Evolved NodeB (Evolved NodeB (eNB)) for the user equipment before receiving or transmitting service data, the DCI is carried on a Physical Downlink Control CHannel (Physical Downlink Control CHannel (PDCCH)). Generally, one PDCCH is aggregated by 1, 2, 4, or 8 continuous Control Channel Elements (Control Channel Element (CCE)), and each aggregation level corresponds to a search space, the aggregation level represents the number of CCEs by which the PDCCH is aggregated, and the search space is a set of PDCCHs to be detected by the UE, for example, the search space with the aggregation level of 4 is a set of PDCCHs which includes all PDCCHs aggregated by 4 CCEs and to be monitored by the UE. The search space may include Common Search Space (Common Search Space (CSS)) and UE Specific Search Space (UE Specific Search Space (UESSS)).

In order to decrease the delay of user's plane, in the Long Term Evolution Advanced (Long Term Evolution Advanced (LTE-A)) system, a Contention Based (Contention Based (CB)) uplink transmission solution is proposed, that is, the base station allocates a same uplink resource to a group of uplink synchronization users (i.e., a CB user group) dynamically by Contention Based uplink Grant (Contention Based uplink Grant (CB Grant)) information at each Transmission Time Interval (Transmission Time Interval (TTI)). The so called CB Grant is downlink control information carried on the PDCCH and is used for granting information required by the contention based uplink transmission, including the allocated uplink time-frequency domain resource information, Modulation and Coding Scheme ((MCS) Modulation and Coding Scheme) and so on. In the CB uplink transmission solution, when there is uplink data to be transmitted, users in the CB user group needn't to send Scheduling Request Indicator ((SRI) Scheduling Request Indicator) in advance, they only need to monitor the CB Grant and then directly use the granted CB resource (for example, the allocated uplink time-frequency domain resource) to transmit uplink data or report Buffer Status Report ((BSR) Buffer Status Report).

In the above CB uplink transmission method, the delay of the user's plane cannot be decreased because the overhead of the CB Grants is large and the PDCCH scheduling blocking is easy to occur, that is, the CB Grants are hard to be scheduled.

SUMMARY

Embodiments of the present invention provide a method, a configuration method and a related apparatus for contention based uplink transmission, which can decrease overhead of the CB Grants.

In an aspect, a configuration method for contention based uplink transmission is provided, including:

configuring contention based user group numbers and configuring a same contention based radio network temporary identifier CB-RNTI for multiple contention based user groups;

configuring a same contention based uplink grant CB Grant for the multiple contention based user groups having the same CB-RNTI.

In an aspect, a method for contention based uplink transmission is provided, including:

acquiring contention based user group numbers and a same contention based radio network temporary identifier CB-RNTI configured for multiple contention based user groups;

monitoring a contention based uplink grant CB Grant according to the CB-RNTI to determine schedule information required by the contention based uplink transmission, the schedule information includes contention based uplink transmission resource; transmitting uplink data or reporting buffer status report by using the contention based uplink transmission resource granted by the CB Grant.

In an aspect, a base station is provided, including:

a first configuration module configured to configure contention based user group numbers and configuring a same contention based radio network temporary identifier CB-RNTI for multiple contention based user groups;

a second configuration module configured to configure a same contention based uplink grant CB Grant for the multiple contention based user groups having the same CB-RNTI configured by the first configuration module.

In an aspect, a user equipment is provided, including:

an acquiring module configured to acquire contention based user group numbers and a same contention based radio network temporary identifier CB-RNTI configured for multiple contention based user groups;

a determination module configured to monitor a contention based uplink grant CB Grant according to the CB-RNTI acquired by the acquiring module to determine schedule information required by the contention based uplink transmission, the schedule information includes contention based uplink transmission resource;

a transmission module configured to transmit uplink data or reporting buffer status report by using the contention based uplink transmission resource granted by the CB Grant, the contention based uplink transmission resource is in the schedule information determined by the determination module.

In the present invention, a same CB-RNTI is configured for multiple CB user groups, and partial schedule information required by the contention based uplink transmission can be configured by a higher layer signaling, so only one CB Grant is needed to be configured for the multiple contention based user groups, therefore, the CB Grant does not need to be transmitted to each CB user group, and thus the resource overhead for transmitting the CB Grants is decreased and the occurring probability of scheduling blocking is reduced.

DETAILED DESCRIPTION

Figure 1:
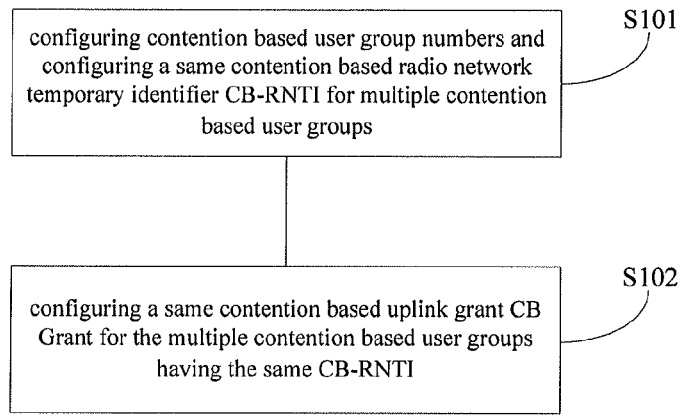
FIG. 1 is a basic flow diagram of a configuration method for contention based uplink transmission according to an embodiment of the present invention.

Referring to FIG. 1, which is a basic flow diagram of a configuration method for contention based uplink transmission according to an embodiment of the present invention, and the method mainly includes the following steps.

S101, configuring contention based user group numbers and configuring a same Contention Based Radio Network Temporary Identifier ((CB-RNTI) Contention Based Radio Network Temporary Identifier) for multiple contention based user groups.

In an actual networking environment, a cell is usually configured with multiple CB user groups, and each CB user group includes at least one CB user. In order to make each CB user acquire the CB user group it belongs to for subsequently reading schedule information of the corresponding schedule domain in the CB Grant, CB user group numbers are used to identify the CB user groups in the embodiment of the present invention.

A system may include multiple CB users or multiple CB user groups, and therefore multiple CB grants are needed. In order to distinguish different CB Grants, different identifiers, i.e., CB-RNTIs, are needed to be configured.

Further, a contention based user number (abbreviated as CB user number below) may be configured for each CB user in each CB user group by a dedicated Radio Resource Control ((RRC) Radio Resource Control) signaling, the CB user number is used for identifying the CB user in the CB user group.

S102, configuring a same contention based uplink grant CB Grant for the multiple contention based user groups having the same CB-RNTI.

The CB Grant is used for scheduling the contention based uplink transmission, the bit information thereof is mainly used for indicating the allocated uplink time-frequency domain resource information, and the redundancy bits are used for indicating scheduling information such as MCS. In the embodiment of the present invention, the CB Grant is not configured for each CB user group, but a same CB Grant is configured for multiple contention based user groups having a same CB-RNTI.

It should be noted that, as long as a same Grant used for scheduling the uplink transmission is configured for multiple users or user groups, the multiple users or user groups may be regarded as CB users or CB user groups, the Grant may be regarded as CB Grant and the RNTI used for identifying the Grant may be regarded as CB-RNTI, even the schedule scheme used by the base station is non-contentions (i.e., the user or the user group currently scheduled is explicitly indicated in the Grant). Therefore, all methods of the embodiments of the present invention are applicable to the multiple users or user groups.

It is can be known from the above embodiment of the present invention that, since a same CB-RNTI may be configured for multiple CB user groups, only a same CB Grant is needed to be configured for the multiple contention based user groups, therefore, in the present invention, there is no need to send the CB Grant to each CB user group, and thus the resource overhead for transmitting the CB Grants is decreased, and the occurring probability of scheduling blocking is decreased.

A configuration method of an embodiment of the present invention is described below by taking an execution entity such as a base station of a LTE-A system as an example.

In an embodiment of the present invention, a user equipment monitors information required by the CB Grant, which includes CB-RNTI, CB user group number and partial schedule information required by the CB uplink transmission, the information may be semi-statically configured by a higher layer signaling or pre-defined by a standard pre-definition. In the present embodiment, the higher layer signaling includes a broadcast signaling, a Radio Resource Control ((RRC) Radio Resource Control) signaling and a Media Access Control ((MAC) Media Access Control) signaling. In order to ensure reliability, preferably, a RRC signaling is used to notify the user equipment of information required by the current user equipment for monitoring the CB Grant in the embodiment of the present invention. The configurations of information required for monitoring the CB Grant are described specifically below.

An embodiment of configuring the CB-RNTI is:

a system may include multiple CB users or multiple CB user groups, so multiple CB Grants are needed, in order to distinguish different CB Grants, different identifications, i.e., CB-RNTIs, are needed to be configured. In the embodiment of the present invention, the base station may configure a same CB-RNTI for multiple CB user groups. For example, there are four CB user groups in a cell, and the base station configures a same CB-RNTI for the four user groups; or there are seven CB user groups in a cell, and the base station configures a CB-RNTI for four CB user groups and configures another CB-RNTI for the other three CB user groups.

An embodiment of configuring the CB user group number is:

in an actual networking environment, a cell is usually configured with multiple CB user groups, and each CB user group includes at least one CB user. In the embodiment of the present invention, each CB user needs to acquire the CB user group it belongs to, and the CB user group is identified by the CB user group number. The CB user can read schedule information in a corresponding schedule domain in the CB Grant after acquiring the CB user group number of the CB user group it belongs to. In the embodiment, the base station may configure a CB user group number for each CB user by a higher layer signaling. In order to ensure reliability, the higher layer signaling is preferably a RRC signaling.

The CB user group number may also be configured in a standard pre-definition manner, for example, using a Hash function as a transformation function and taking the CB-RNTI configured for each CB user as an input parameter, the value obtained by a stochastic calculation is the CB user group number of the CB user.

Another embodiment of configuring the CB user number is as follow:

configuring a number, i.e., a CB user number, for each CB user in each CB user group. The CB user number is used for identifying the CB user in the CB user group. For example, the base station configures a CB Grant for four CB user groups, the CB user group 1 includes four CB users and needs 2 bits to indicate the CB user numbers, where "00" represents CB user 1, "01" represents CB user 2, "10" represents CB user 3 and "11" represents CB user 4. When a user indication domain (UE index) is set in the CB Grant, the actually scheduled CB user in the CB user group, i.e., the actual user scheduled by the CB Grant, can be indicated. For example, the user indication domain of 2 bits is set in the CB Grant, and the indication of "00" represents the CB user 1 is scheduled. Preferably, the CB user number is configured for the CB user by using a dedicated RRC signaling.

During the configuration of the CB user number by the base station, step S101 also includes configuring a contention based user number for each contention based user in each contention based user group by a dedicated radio resource control signaling.

An embodiment of configuring partial schedule information required by the contention based uplink transmission is:

after or while configuring the contention based user group numbers and configuring a same contention based radio network temporary identifier CB-RNTI for multiple contention based user groups, the partial schedule information required by the contention based uplink transmission may be configured.

In the embodiment, partial schedule information required by the contention based uplink transmission mainly includes one or more of modulation and coding scheme, power control command, size of frequency domain resource, resource allocation scheme, frequency hopping indication, cyclic shift indication, precoding information and number of layers, a specific description thereof is as follow:

(1) configuration concerning the modulation and coding scheme and power control command. The contention based uplink transmission refers to a group of users contend for a same resource for transmitting data and BSR, and thus the base station cannot determine which user equipment needs to transmit data in advance and cannot estimate which user equipment is going to be successful in the contention, therefore, the base station may configure the MCS and the power control command according to a poor channel condition. The range of the MCS value may be the range defined by LTE Rel-8 or may be some low level MCSs thereof, and it is not limited in the present invention.

(2) configuration concerning the size of the frequency domain resource (that is, the number of allocated RBs for the CB uplink transmission). Because the contention based uplink transmission is usually transmission of small data packets, only small numbers of Resource Blocks ((RB) Resource Block), for example, 1 to 4 RBs, are needed to be allocated in the frequency domain. The size of the transmission packet can be determined according to the size of the frequency domain resource and the modulation and coding scheme. Notifying of the size of the frequency domain resource allocated for the CB uplink transmission directly if the current configuration is a continuous frequency domain resource allocation (specifically referring to the description corresponding to S102 of the embodiment below); notifying of the number of noncontinuous frequency domain clusters allocated for the CB uplink transmission and the size of each noncontinuous frequency domain cluster if the current configuration is a limited noncontinuous resource allocation (specifically referring to the description corresponding to S102 of the embodiment below), for example, only two noncontinuous frequency domain clusters can be configured currently, and the size of each noncontinuous frequency domain cluster is 2RBs, thus the size of the frequency domain resource totally allocated for the CB uplink transmission is 4RBs.

(3) configuration concerning the resource allocation scheme. When there are several uplink resource allocation schemes, the resource may be semi-statically configured by a higher layer signaling. For example, if there are two frequency domain resource allocation schemes in the system, i.e., continuous frequency domain resource allocation scheme and noncontinuous frequency domain resource allocation scheme, the current allocation scheme may be configured by a higher layer signaling.

(4) configuration concerning the frequency hopping indication. Since the base station at this time cannot determine which CB user is going to transmit data on the CB uplink resource, the base station cannot select suitable uplink channel resource for the CB user for scheduling. If Frequency Hopping ((FH) Frequency Hopping) is enabled, a frequency diversity gain can be obtained and uplink data demodulation performance can be enhanced. Therefore, the base station may determine whether to enable the frequency hopping according to the current frequency spectrum usage.

(5) configuration concerning the cyclic shift indication. A DeModulation Reference Signal ((DMRS) DeModulation Reference Signal) used for PUSCH demodulation has several groups of cyclic shift ((CS) cyclic shift) values, using a higher layer signaling to configure the cyclic shift indication may cause different CB user groups to use different CSs, and provide a possibility for Multiple User Multiple Input Multiple Output ((MU-MIMO) Multiple User Multiple Input Multiple Output) configuration. Specifically, the base station configures a same time-frequency resource for multiple CB user groups and uses an orthogonal reference signal to form the MU-MIMO.

Further, the partial schedule information required by the contention based uplink transmission in the present invention may include some other information required for scheduling, it is not limited in the embodiment and the description thereof is omitted.

The above mentioned schedule information is parameters which are not frequently or dynamically changed after configuration, so the information can be transmitted to the CB user by a higher layer signaling after being semi-statically configured, and does not need to be transmitted to the CB user by the CB Grant dynamically, therefore the overhead of the CB Grants is decreased.

The above mentioned schedule information is not limited to be semi-statically configured by the higher layer signaling, it also may be configured in a standard pre-definition manner, such as fixing the modulation and coding scheme and the transmission power value, fixing the size of the frequency domain resource to 2RBs, defining an unique resource allocation scheme, using no frequency hopping, and fixing the CS value to a constant, there is no limitation to the configuration scheme in the present invention.

It should be further noted that the above mentioned schedule information may be partly configured by a higher layer signaling, or partly configured by a standard pre-definition, or partly configured by the CB Grant (specifically referring to the description corresponding to S102 of the embodiment below), there is no limitation to the configuration scheme in the present invention.

Further description of configuring a same CB Grant for multiple CB user groups having a same CB-RNTI will be made below.

In the embodiment, the base station is configured to configure a same CB Grant for multiple CB user groups having a same CB-RNTI, that is, the base station configures a same CB Grant and a same CB-RNTI for multiple CB user groups.

Comparing with the case that one user needs one CB Grant, the number of the CB Grants needed to be transmitted is decreased by using the technical solution provided by the present invention. For example, a PDCCH can schedule four CB user groups, and two PDCCHs can schedule eight CB user groups, therefore, the occurring probability of scheduling blocking is decreased.

Figure 2:
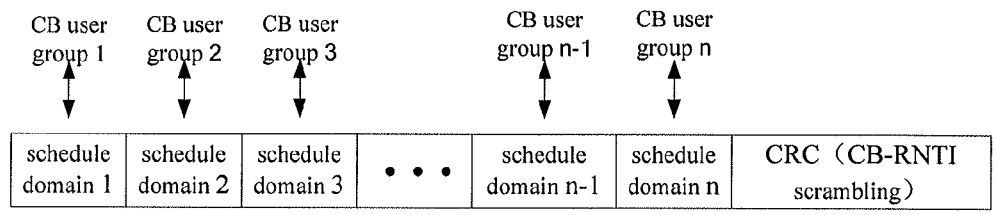
FIG. 2 is a schematic structure diagram of a CB Grant according to an embodiment of the present invention.

In the embodiment of the present invention, the CB Grant includes several schedule domains, and the CB user group numbers correspond to the schedule domain numbers used for identifying the schedule domains in the CB Grant respectively, as shown in FIG. 2. Each schedule domain is used for indicating the schedule information of each CB user group, including schedule information used for allocating the CB uplink resource (for example, the occupied frequency domain resource), or may including partial schedule information such as one or more of power control command, modulation and coding scheme and redundancy version.

The CB uplink frequency domain resource may be configured by using a continuous frequency domain resource allocation scheme or a noncontinuous frequency domain resource allocation scheme in the configuration of the CB Grant. However, in order to decrease the overhead of the resource allocation, methods of indicating the starting point of the frequency domain resource are proposed respectively for the continuous resource allocation and the noncontinuous resource allocation in the embodiment of the present invention. It should be noted that the resource allocation method provided by the embodiment of the present invention is not limited to be applied to the present invention.

How to use the continuous frequency domain resource allocation scheme to allocate the CB uplink frequency domain resource is specifically described below.

In the embodiment of the present invention, if the continuous frequency domain resource allocation scheme is used to allocate the CB uplink frequency domain resource, the continuous frequency domain resource in the uplink frequency domain resource may be allocated, only the starting point of the continuous frequency domain resource is indicated during the allocation, and the size of the continuous frequency domain resource (i.e., the number of the allocated RBs used for CB uplink transmission) is not indicated. On one hand, the schedule information in the schedule domain of the CB Grant (mainly used for allocating the schedule information of the CB uplink resource) can be represented by a small number of bits, and thus the overhead required for transmitting the CB Grant is saved; on the other hand, the packet of the CB uplink transmission is small, and thus only a small number of RBs are needed to be allocated, the size of the frequency domain resource may be semi-statically configured by a higher layer signaling or may be pre-defined by a standard pre-definition, and does not need to be configured by the CB Grant dynamically.

In the embodiment of the present invention, only the starting point of the continuous frequency domain resource is indicated, and the size of the continuous frequency domain resource is not indicated, specifically, there may be three modes.

Figure 3:
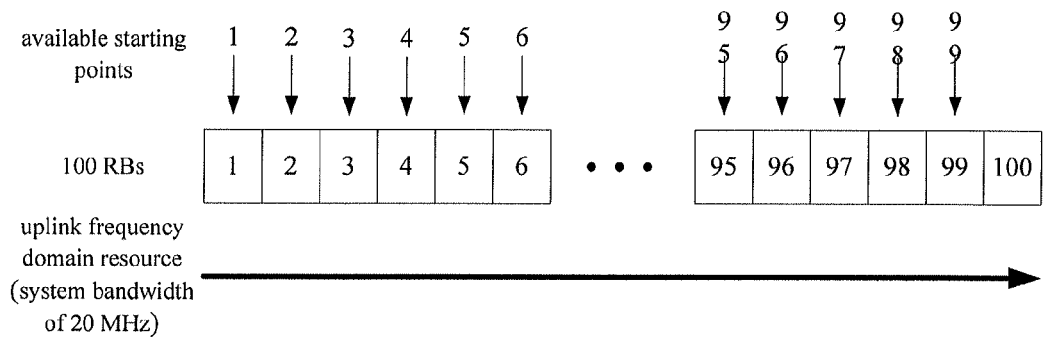
FIG. 3 is a schematic diagram of indicating starting points of uplink frequency domain resources according to an embodiment of the present invention.

Mode one, indicating one of all available starting points in the uplink frequency domain resource according to the size of the frequency domain resource of the currently-configured transmission packet. For example, under a system bandwidth of 20 MHz (i.e., uplink frequency domain resource), 100 RBs are configured in the frequency domain, provided that the size of the frequency domain resource of the currently-configured contention based transmission packet is 2 RBs, so there are totally 99 available starting points in the uplink frequency domain resource, as shown in FIG. 3, only one of the 99 available starting points is needed to be indicated in the specific allocation, whereas the overhead of the bit numbers required for indicating all 99 available starting points is ceil $(\log_2(99))=7$ bit, where ceil(*) represents upward rounding. In the same way, provided that the size of the frequency domain resource of the current transmission packet is 3 RBs, so there are totally 98 available starting points in the uplink frequency domain resource, only one of the 98 available starting points is needed to be indicated in the specific allocation; provided that the size of the frequency domain resource of the current transmission packet is 1 RB, so there are totally 100 available starting points in the uplink frequency domain resource, only one of the 100 available starting points is needed to be indicated in the specific allocation. In the same way, the calculation of the overhead of the bit numbers required for indicating the 98 and 100 available starting points is the same as the calculation of the overhead of the bit numbers required for indicating the 99 available starting points in the above embodiment, and the discussion thereof is omitted.

Figure 4:
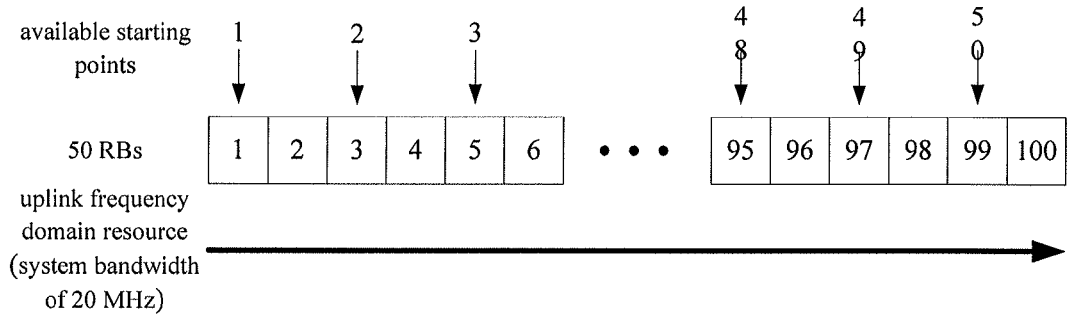
FIG. 4 is another schematic diagram of indicating uplink frequency domain resource according to an embodiment of the present invention.

Mode two, indicating one of all available starting points in the uplink frequency domain resource at an interval of several resource blocks according to the size of the frequency domain resource of the currently-configured transmission packet. For example, under a system bandwidth of 20 MHz, 100 RBs are configured in the frequency domain, provided that the size of the frequency domain resource of the current transmission packet is 2 RBs and indicating all available starting points at an interval of 2 RBs (including the first RB) by taking the first RB as the starting point, as shown in FIG. 4, so there are totally 50 available points in the uplink frequency domain resource, only one of the 50 available starting points is needed to be indicated in the specific allocation, whereas the required overhead of the bit numbers is 6 bits. In the same way, provided that the size of the frequency domain resource of the current transmission packet is 3 RBs and indicating all available starting points at an interval of 2 RBs (including the first RB) by taking the first RB as the starting point, so there are totally 49 available starting points in the uplink frequency domain resource.

Mode three, indicating one of all available starting points in part of the uplink frequency domain resource according to the size of the frequency domain resource of the currently-configured transmission packet. For example, under a system bandwidth of 20 MHz, 100 RBs are configured in the frequency domain, and only 60 RBs thereof are indicated, provided that the size of the frequency domain resource of the current transmission packet is 2 RBs, so there are totally 59 available starting points in the uplink frequency domain resource, only one of the 59 available starting points is needed to be indicated in the specific allocation, whereas the overhead of the bit numbers required for indicating all 59 available starting points is 6 bits.

Mode four, indicating one of all available starting points in part of the uplink frequency domain resource at an interval of several resource blocks according to the size of the frequency domain resource of the currently-configured transmission packet. For example, under a system bandwidth of 20 MHz, 100 RBs are configured in the frequency domain, and only 60 RBs thereof are indicated, provided that the size of the frequency domain resource of the current transmission packet is 2 RBs and indicating all available starting points at an interval of 4 RBs (including the first RB) by taking the first RB as the starting point, so there are totally 15 available points in the uplink frequency domain resource, only one of the 15 available starting points is needed to be indicated in the specific allocation, whereas the overhead of the bit numbers required for indicating all 15 available starting points is 4 bits.

How to use the limited noncontinuous frequency domain resource allocation scheme to allocate the CB uplink frequency domain resource is specifically described below, that is, using the noncontinuous frequency domain resource allocation scheme to allocate the noncontinuous frequency domain resource in the uplink frequency domain resource.

If the size of the frequency domain resource of the transmission packet is larger than 1 RB, employing the noncontinuous resource allocation can make better use of the existing frequency domain resource, and can fill up the blank of the frequency domain.

The limited noncontinuous frequency domain resource allocation scheme has the following two aspects.

On one hand, limiting the number of the noncontinuous frequency domain clusters, the relative limitation may be semi-statically configured by a higher layer signaling or may be pre-defined by a standard pre-definition (specifically referring to the description corresponding to S101 of the above embodiment).

On the other hand, as using the continuous frequency domain resource allocation scheme to allocate the CB uplink frequency domain resource, in order to save the overhead, when using the noncontinuous frequency domain resource allocation scheme to allocate the noncontinuous frequency domain resource in the uplink frequency domain resource, only the starting point of each noncontinuous frequency domain cluster is indicated and the size of each noncontinuous frequency domain cluster is not indicated, this is because the size of each noncontinuous frequency domain cluster may be notified of by a higher layer signaling or may be pre-defined by a standard pre-definition (specifically referring to the description corresponding to S101 of the above embodiment).

When using the limited noncontinuous frequency domain resource allocation scheme to allocate the CB uplink frequency domain resource, the method of indicating the starting point of each noncontinuous frequency domain cluster may be similar to the method of indicating only the starting point of the continuous frequency domain resource in allocating the continuous frequency domain resource in the uplink frequency domain resource, that is, indicating one of all available starting points in the uplink frequency domain resource according to the size of the frequency domain resource of the currently-configured transmission packet; or indicating one of all available starting points in the uplink frequency domain resource at an interval of several resource blocks according to the size of the frequency domain resource of the currently-configured transmission packet; or indicating one of all available starting points in part of the uplink frequency domain resource according to the size of the frequency domain resource of the currently-configured transmission packet; or indicating one of all available starting points in part of the uplink frequency domain resource at an interval of several resource blocks according to the size of the frequency domain resource of the currently-configured transmission packet.

Taking the case that indicating one of all available starting points in the uplink frequency resource as an example, provided that under a system bandwidth of 20 MHz, 2 noncontinuous frequency domain clusters are allowed and the size of each noncontinuous frequency domain cluster is 1 RB, indicating each noncontinuous frequency domain cluster independently in the specific allocation, and the overhead for indicating all available starting points in the uplink frequency domain resource is 14 bits. The starting points also can be selected by using a method of selecting a combination of M points from N points ($C_N^M$), and there are $C_{100}^2 = 4950$ states, the overhead of indicating the 4950 available starting points is 13 bits.

As described above, in the embodiment of the present invention, each CB Grant includes several schedule domains, information bit of each schedule domain mainly indicates schedule information used for allocating the CB uplink frequency domain resource, and redundancy bits are used for indicating some other schedule information such as one or more of power control command, modulation and coding scheme, Redundancy Version ((RV) Redundancy Version), frequency domain frequency modulation information and cyclic shift indication. The power control command may be defined in combination with an existing definition method and may be indicated by 1 bit or 2 bits; and for a combination of RV and MCS of LTE Rel-8, 5 bits are needed for indication and the overhead is large. In order to save overhead, the higher layer signaling may be configured with several options of MCS+RV, and a specific option is indicated by the CB Grant; the existing cyclic shift indication needs 3 bits to indicate 8 states, in order to save overhead, the indicated states may be reduced, for example, using 1 bit to indicate 2 cyclic shift values. In addition, 1 bit of the redundancy bits may be used to indicate Channel State Information Request ((CSIR) Channel State Information Request), i.e., whether the aperiodic CSI is transmitted on the PUSCH; 1 bit of the redundancy bits is used to indicate resource allocation type, i.e., whether the continuous or noncontinuous resource allocation is used; parts of the redundancy bits are used to indicate Precoding information and number of layers.

It should be noted that schedule information such as power control command, MCS and RV needn't to be indicated dynamically and precisely. It is only an optional solution that configuring the schedule information in the CB Grant in the embodiment of the present invention, the schedule information also can be semi-statically configured by a higher layer signaling or pre-defined by a standard pre-definition, the discussion thereof is described in the corresponding parts of the foregoing embodiments and thus omitted herein.

Setting a user indication domain in the CB Grant after the CB user number is configured by the base station, where the user indication domain is used for indicating the scheduled CB user in the CB user group. For example, the user indication domain of 2 bits is set in each schedule domain in the CB Grant, for the schedule domain 1, "00" represents the CB user 1 in the CB user group 1 is scheduled and all schedule information in the schedule domain 1 is used for indicating the uplink transmission of the CB user 1. The currently-scheduled user can be indicated after the CB user number and the user indication domain are configured, and the based station does not need to determine which user transmits the uplink transmission data subsequently.

In order not to add new bits of downlink control information (i.e., the size of the DCI load), the number of PDCCH Blind Decodings ((DB) Blind Decoding) is controlled, and the number of the CB Grant bits provided by the embodiment of the present invention may be designed to be the same as the number of the information bits of the downlink control information format 3/3A or format 1C, for example, the number of the CB Grant bits is designed to be the same as the number of the information bits of the downlink control information format 3/3A or format 1C of LTE Rel-8. The DCI of LTE Rel-8 carried on the common search space includes DCI format 3/3A, DCI format 0/1A and DCI format 1C, where the information bits of the DCI format 3/3A and DCI format 0/1 are same and much more than the DCI format 1C. When CB Grant is limited to be carried on the common search space, considering that a CB Grant can schedule multiple CB user groups, preferably, the information bits of the CB Grant is designed to be the same as the DCI format 3/3A. In addition, a reasonable information overhead is designed according to requirement, and different CB Grants may be designed to have different length, for example, 6 CB user groups are needed currently, where 4 CB user groups use a same CB Grant and the number of the information bits thereof is the same as the DCI format 3/3A, the other 2 CB users use another CB Grant and the number of the information bits thereof is the same as the DCI format 1C.

For example, under a system bandwidth of 20 MHz, the number of the information bits of the DCI format 3/3A is 44 bits. The number of the information bits of the CB Grant provided by the embodiment of the present invention is designed to be 44 bits. There are 28 bits which may be used for scheduling the CB uplink transmission except the Cyclic Redundancy Check ((CRC) Cyclic Redundancy Check) of 16 bits. When the first method of CB uplink frequency domain resource allocation is employed (continuous frequency domain resource allocation, only one of all available starting points in the uplink frequency domain resource is indicated, and the size of the frequency domain resource is not indicated), each CB uplink transmission needs about 7 bits, and thus each CB Grant can schedule four CB user groups. When the CB uplink frequency domain resource is allocated by the limited noncontinuous frequency domain resource allocation scheme (for example, defining two noncontinuous frequency domain clusters, and the size of each noncontinuous frequency domain cluster is 1 RB, only the starting point of each noncontinuous frequency domain cluster is indicated), each CB uplink transmission needs about 14 bits, and thus each CB Grant can schedule two CB user groups. Specifically, if indicating one of all available starting points in the uplink frequency domain resource at an interval of several resource blocks, or indicating one of all available starting points in part of the uplink frequency domain resource, or indicating one of all available starting points in part of the uplink frequency domain resource at an interval of several resource blocks, some bits (i.e., redundancy bits) may be reserved for indicating other schedule information such as power control command and MCS, or may be used as virtual CRC to reduce the probability of CRC false alarm.

Further, if the CB Grant provided by the embodiment of the present invention is limited to be carried on the common search space, the size of the common search space may be extended since the capacity of the existing common search space is finite, the size of the extension may be pre-defined by a standard pre-definition or semi-statically configured by a higher layer signaling. It should be noted that if other downlink control information similar to CB Grant needs to be transmitted in the common search space, the search space may be extended for the same reason provided by the embodiment of the present invention.

Figure 5:
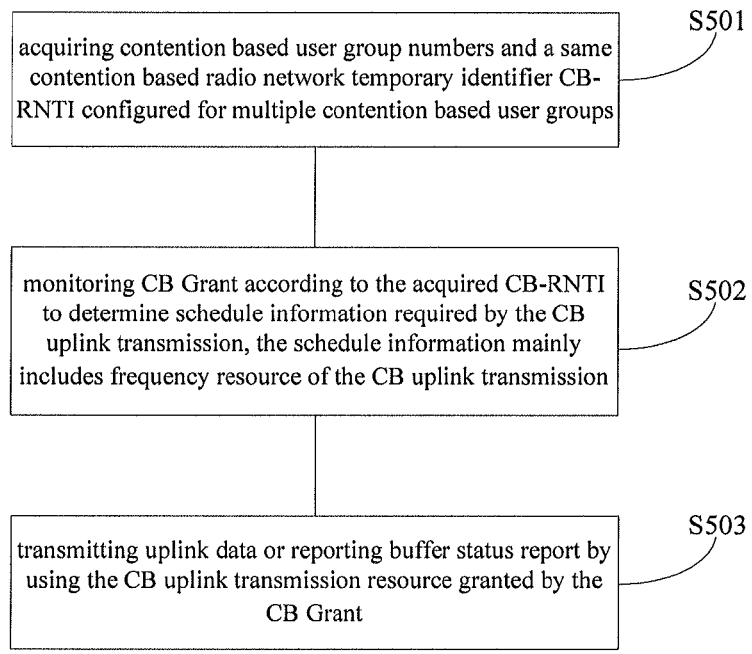
FIG. 5 is a basic flow diagram of a method for contention based uplink transmission according to an embodiment of the present invention.

Please referring to FIG. 5, which is a basic flow diagram of a method for contention based uplink transmission according to an embodiment of the present invention. The execution subject of the transmission method may be but not limit to user equipment of LTE-A system, and the method mainly includes the following execution steps.

S501, acquiring contention based user group numbers and a same contention based radio network temporary identifier CB-RNTI configured for multiple contention based user groups.

In the embodiment, the user equipment acquires its CB-RNTI by receiving a higher layer signaling. In the same way, the UE acquires the CB user group number it belongs to by receiving a higher layer signaling, or determines the CB user group number it belongs to in a standard pre-definition manner.

Further, the user equipment may acquire its CB user number by receiving a dedicated RRC signaling.

Some schedule information required by the contention based uplink transmission, such as one or more of MCS, power control command, size of frequency domain resource, frequency domain resource allocation scheme, frequency hopping indication and cyclic shift indication, may be acquired by receiving a higher layer signaling or determined by a standard pre-definition by the UE.

S502, monitoring the CB Grant according to the acquired CB-RNTI to determine the schedule information required by the CB uplink transmission, the schedule information mainly includes frequency domain resource of the CB uplink transmission.

In the embodiment, the CB Grant is used for scheduling the contention based uplink transmission, and the bit information thereof is mainly used for indicating the allocated uplink time-frequency domain resource information. Further, when the CB user number is configured by the base station, the bit information of the CB Grant further includes a user indication domain, and the user indication domain is used for indicating the scheduled CB user in the CB user group. The redundancy bits are used for indicating some other schedule information, such as one or more of power control command, MCS, RV, frequency domain frequency modulation information and cyclic shift indication.

In another embodiment of the present invention, the redundancy bits are used for indicating some other schedule information, including one or more of power control command, MCS, RV, frequency domain frequency modulation information, cyclic shift indication, channel state information request, resource allocation type, precoding information and number of layers.

Since the CB Grant is allocated dynamically by the base station, the delay of the user's plane is decreased, and the frequency domain resource is allocated flexibly. However, when the UE needs to transmit uplink data and is not configured with CB Grant of non-contention uplink transmission, the UE may listen the CB Grant and determine available CB uplink transmission resource and some other schedule information, specifically including: monitoring the CB Grant matched with the CB-RNTI according to the acquired CB-RNTI; reading the schedule information indicated by the schedule domain corresponding to the CB user group number according to the acquired CB user group number; and determining available CB uplink transmission resource according to the read schedule information. Other schedule information such as modulation and coding scheme, power control command and redundancy version, if is configured in the CB Grant, also can be read.

For example, the UE reads schedule information of the third schedule domain in the CB Grant according to the currently acquired CB user group number 3, and further determines the currently available CB uplink transmission resource and the configuration information used in the data transmission (when other schedule information is configured in the CB Grant) according to the read information of the schedule domain.

In addition, if the bit information of the CB Grant also includes a user indication domain, the UE determines whether it is currently scheduled by the base station according to the bit value in the user indication domain, i.e., the user equipment reads the schedule information indicated by the schedule domain of the CB Grant corresponding to the CB user group number according to the acquired CB user group number, and determines available contention based uplink transmission resource according to the CB user number acquired by receiving a dedicated RRC signaling and the read schedule information (the user indication domain). For example, a user indication domain of 2 bits is set in each schedule domain in the CB Grant, and for schedule domain 1, indication of "00" represents that CB user 1 in the CB user group 1 is schedule, and in this case, all schedule information in the schedule domain 1 is used for indicating uplink transmission of the CB user 1. Meanwhile, CB users 2, 3 and 4 aware they are not scheduled by reading the user indication domain and thus do not perform uplink transmission.

S503, transmitting uplink data or reporting buffer status report by using the CB uplink transmission resource granted by the CB Grant.

Figure 6:
FIG. 6 is a schematic diagram of a basic logical structure of a base station according to an embodiment of the present invention.

Referring to FIG. 6, which is a schematic diagram of a basic logical structure of a base station according to a sixth embodiment of the present invention. For explanation, only portions related to the embodiment of the present invention are illustrated. Functional modules contained in the base station may be software modules, hardware modules or modules composed of both software and hardware, and include a first configuration module 601 and a second configuration module 602.

The first configuration module 601 is used for configuring contention based user group numbers and configuring a same contention based radio network temporary identifier CB-RNTI for multiple contention based user groups.

Besides configuring the CB-RNTI and the CB user group numbers, the first configuration module 601 is further used for configuring partial schedule information required by the contention based uplink transmission, for example, one or more of modulation and coding scheme, power control command, size of frequency domain resource, resource allocation scheme, frequency hopping indication, cyclic shift indication, and precoding information and number of layers, the specific configuration method is described in the above method embodiment. Further, the first configuration module 601 may configure a number, i.e., a CB user number, for each CB user in each CB user group by a dedicated radio resource control signaling, and the CB user number is used for identifying the CB user in the CB user group.

The second configuration module 602 is used for configuring a same CB Grant for the multiple CB user groups having the same CB-RNTI configured by the first configuration module 601, specifically, the second configuration module 602 configures the contention based user group numbers and configures the same CB-RNTI for the multiple contention based user groups by a higher layer signaling. The configured same CB Grant specifically includes several schedule domains, where the schedule domain numbers used for identifying the schedule domains correspond the contention based user group numbers configured by the first configuration module 601 respectively.

In the embodiment of the present invention, the CB Grant is used for scheduling the contention based uplink transmission, and the information bit thereof is mainly used for indicating the allocated uplink time-frequency domain resource information. When the CB user number is configured by the base station, setting a user indication domain in the CB Grant, where the user indication domain is used for indicating the scheduled CB user in the CB user group. The redundancy bits may be used for indicating some other schedule information, such as one or more of power control command, MCS, RV, frequency hopping information, cyclic shift indication, channel state information request, resource allocation type, and precoding information and number of layers.

Figure 7:
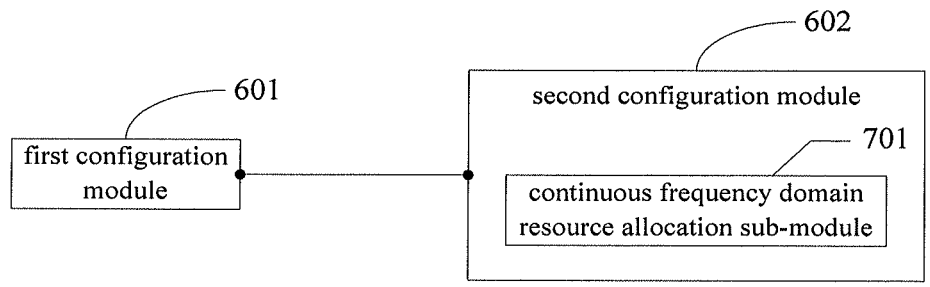
FIG. 7 is a schematic diagram of another basic logical structure of the base station according to an embodiment of the present invention.
Figure 8:
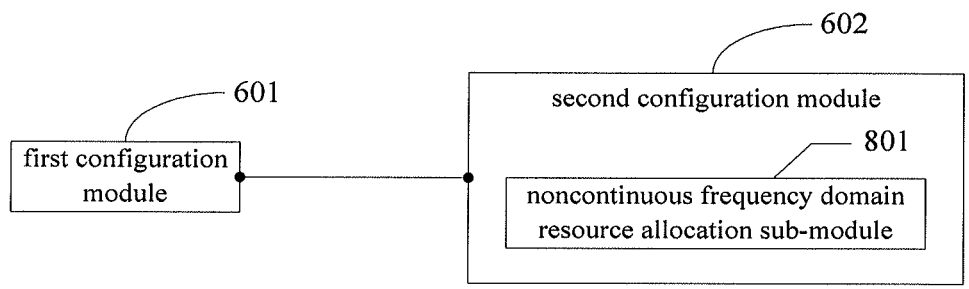
FIG. 8 is a schematic diagram of another basic logical structure of the base station according to an embodiment of the present invention.
Figure 9:
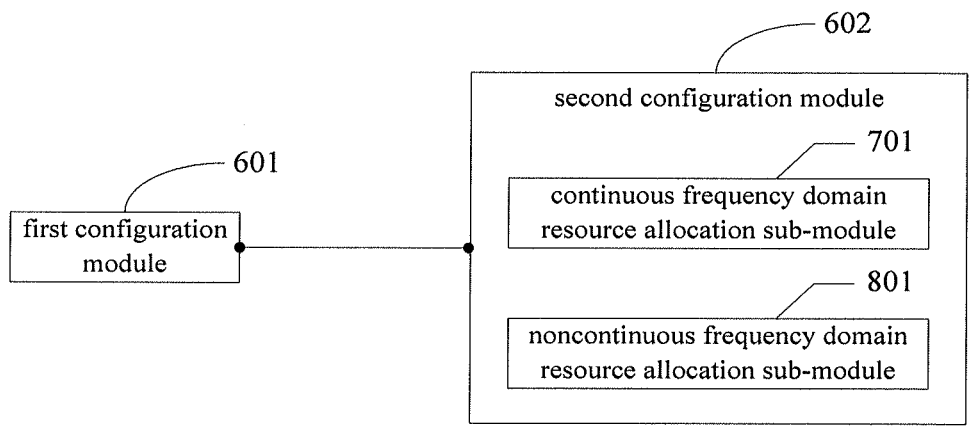
FIG. 9 is a schematic diagram of another basic logical structure of the base station according to an embodiment of the present invention.
Figure 10:
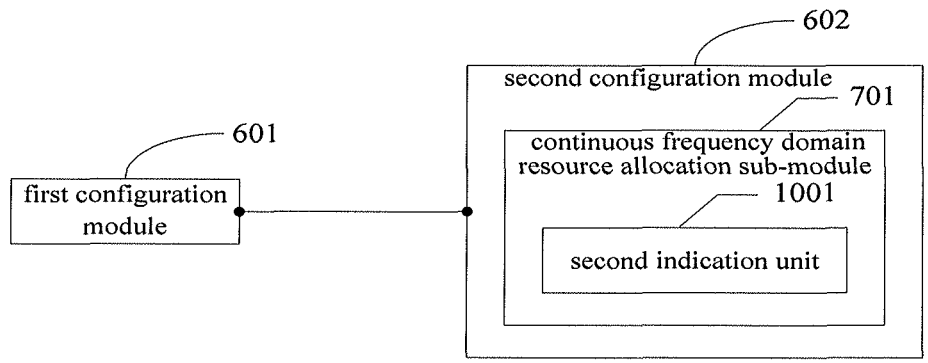
FIG. 10 is a schematic diagram of another basic logical structure of the base station according to an embodiment of the present invention.
Figure 11:
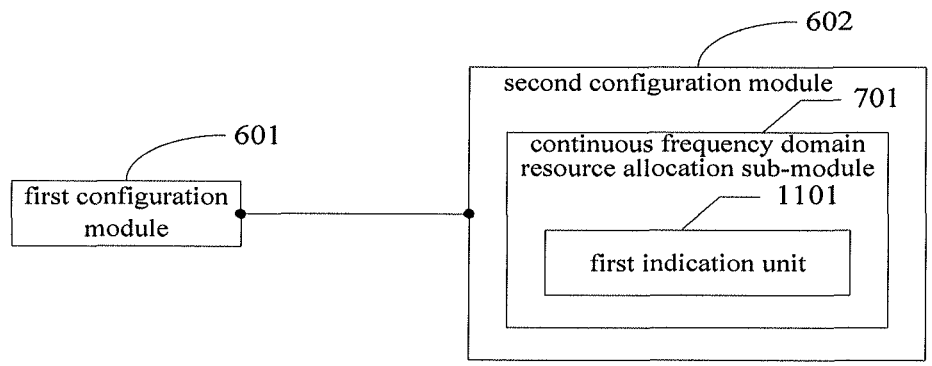
FIG. 11 is a schematic diagram of another basic logical structure of the base station according to an embodiment of the present invention.
Figure 12:
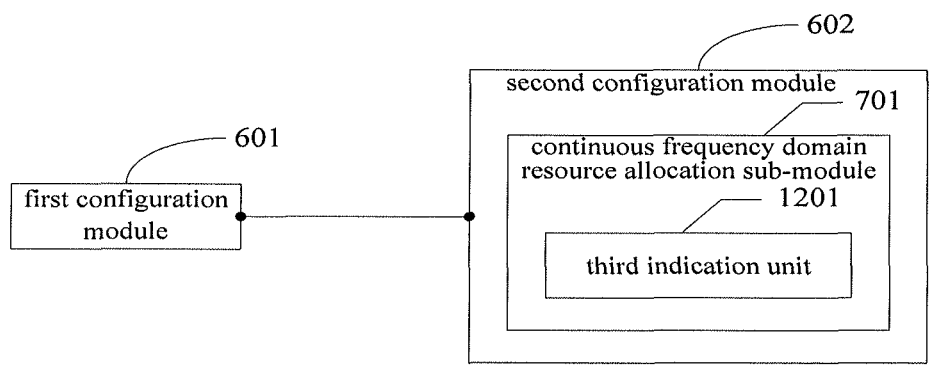
FIG. 12 is a schematic diagram of another basic logical structure of the base station according to an embodiment of the present invention.
Figure 13:
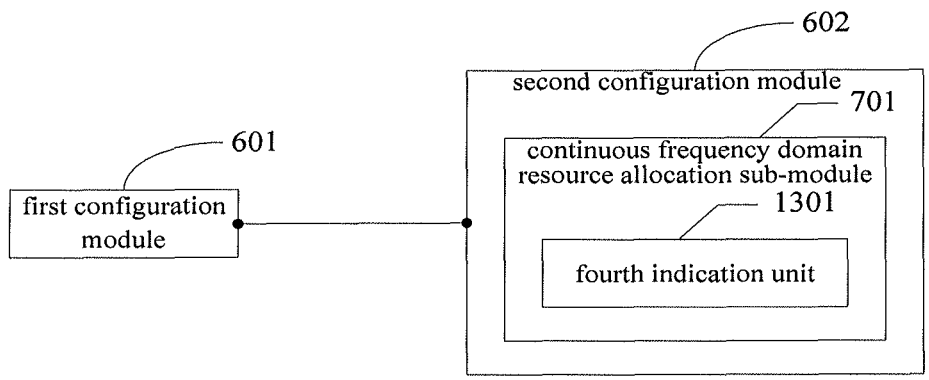
FIG. 13 is a schematic diagram of another basic logical structure of the base station according to an embodiment of the present invention.
Figure 14:
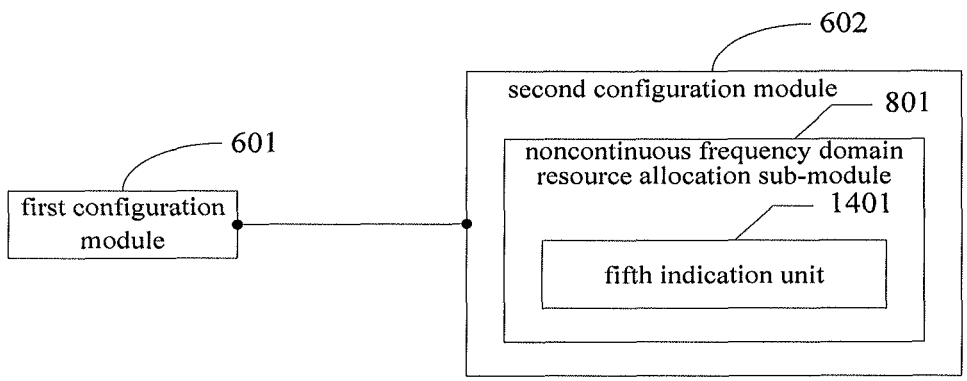
FIG. 14 is a schematic diagram of another basic logical structure of the base station according to an embodiment of the present invention.
Figure 15:
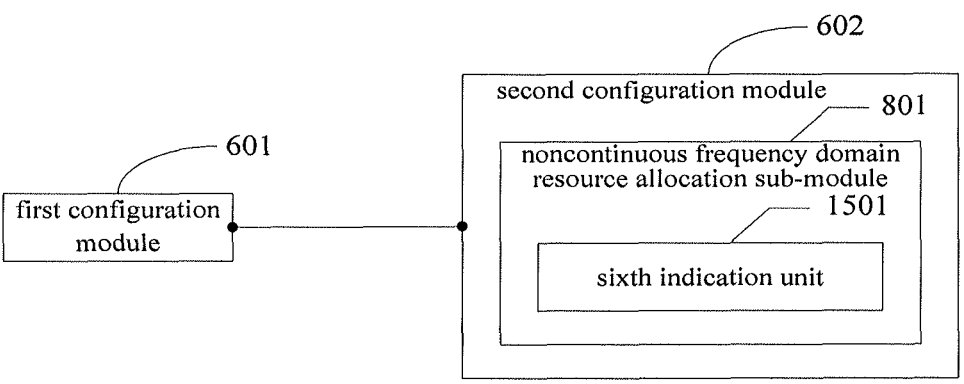
FIG. 15 is a schematic diagram of another basic logical structure of the base station according to an embodiment of the present invention.
Figure 16:
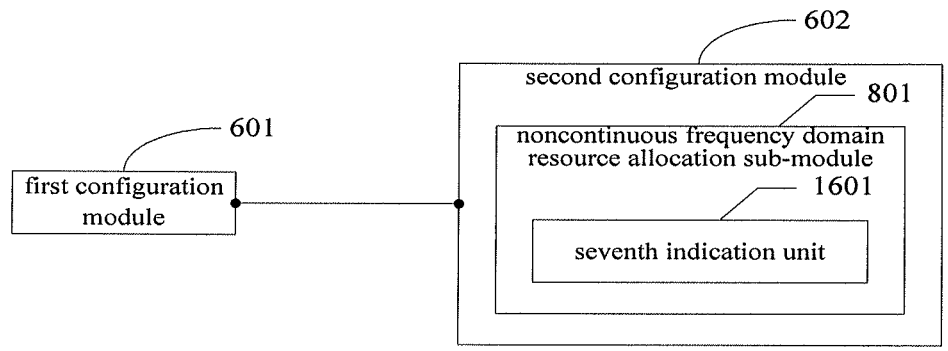
FIG. 16 is a schematic diagram of another basic logical structure of the base station according to an embodiment of the present invention.
Figure 17:
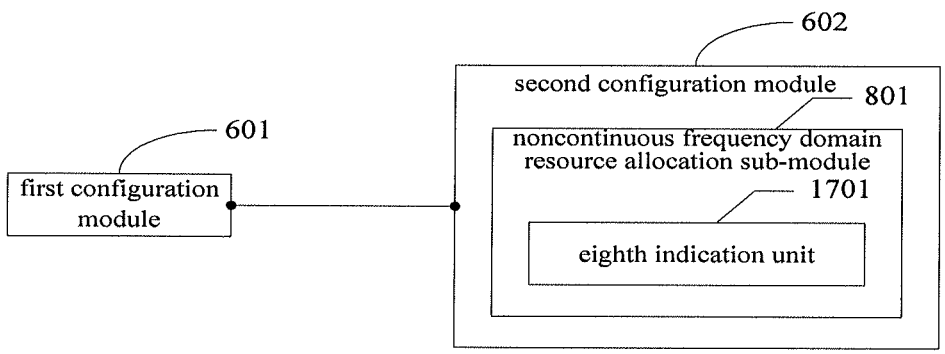
FIG. 17 is a schematic diagram of another basic logical structure of the base station according to an embodiment of the present invention.

When configuring the same CB Grant for the multiple CB user groups having the same CB-RNTI, the second configuration module 602 may allocate continuous frequency domain resource or noncontinuous frequency domain resource in the uplink frequency domain resource by using a continuous frequency domain resource allocation scheme and/or noncontinuous frequency domain resource allocation scheme, and may also use the method of indicating the starting point of the frequency domain resource described in the above embodiment, and thus the overhead due to the CB Grant transmission may be saved, that is, the second configuration module 602 may include continuous frequency domain resource allocation sub-module 701 and/or noncontinuous frequency domain resource allocation sub-module 801, as shown in FIGS. 7, 8, and 9, where the continuous frequency domain resource allocation sub-module 701 is used for allocating the continuous frequency domain resource in the uplink frequency domain resource by using the continuous frequency domain resource allocation scheme, and indicating only the starting point of the continuous frequency domain resource during the allocation; the noncontinuous frequency domain resource allocation sub-module 801 allocates the noncontinuous frequency domain resource in the uplink frequency domain resource by using the noncontinuous frequency domain resource allocation scheme, limits the number of the noncontinuous frequency domain clusters and indicates only the starting points of the noncontinuous frequency domain clusters during the allocation.

The continuous frequency domain resource allocation sub-module 701 shown in FIG. 7 or 9 may further include a first indication unit 1001, a second indication unit 1101, a third indication unit 1201 or a fourth indication unit 1301, as shown respectively in FIGS. 10, 11, 12 and 13 which illustrate the based station provided by the embodiment of the present invention, where:

the first indication unit 1001 is used for indicating one of all available starting points in the uplink frequency domain resource according to the size of the frequency domain resource of the currently-configured transmission packet;

the second indication unit 1101 is used for indicating one of all available starting points in the uplink frequency domain resource at an interval of several resource blocks according to the size of the frequency domain resource of the currently-configured transmission packet;

the third indication unit 1201 is used for indicating one of all available starting points in part of the uplink frequency domain resource according to the size of the frequency domain resource of the currently-configured transmission packet;

the fourth indication unit 1301 is used for indicating one of all available starting points in part of the uplink frequency domain resource at an interval of several resource blocks according to the size of the frequency domain resource of the currently-configured transmission packet.

The noncontinuous frequency domain resource sub-module 801 shown in FIG. 8 or 9 may further include a fifth indication unit 1401, a sixth indication unit 1501, a seventh indication unit 1601 or a eighth indication unit 1701, as shown respectively in FIGS. 14, 15, 16 and 17 which illustrate the base station provided by the embodiment of the present invention, where the fifth indication unit 1401 is used for indicating one of all available starting points in the uplink frequency domain resource according to the size of the frequency domain resource of the currently-configured transmission packet;

the sixth indication unit 1501 is used for indicating one of all available starting points in the uplink frequency domain resource at an interval of several resource blocks according to the size of the frequency domain resource of the currently-configured transmission packet;

the seventh indication unit 1601 is used for indicating one of all available starting points in part of the uplink frequency domain resource according to the size of the frequency domain resource of the currently-configured transmission packet;

the eighth indication unit 1701 is used for indicating one of all available starting points in part of the uplink frequency domain resource at an interval of several resource blocks according to the size of the frequency domain resource of the currently-configured transmission packet.

It can be known from the above embodiment that since the first configuration module 601 configures the information required for monitoring the CB Grant by the user equipment in a static or semi-static manner and the second configuration module 602 configures a same CB Grant for multiple CB user groups having a same CB-RNTI, the CB Grant does not need to be transmitted for each CB user group, and thus the resource overhead for transmitting the CB Grant is reduced, therefore the occurring probability of scheduling blocking is decreased.

Figure 18:
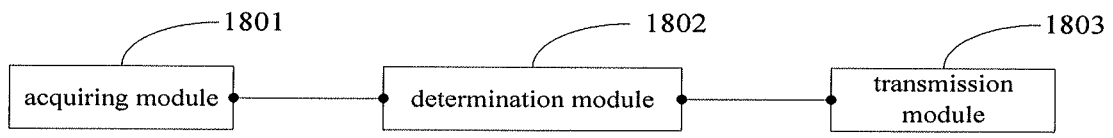
FIG. 18 is a schematic diagram of a basic logical structure of a user equipment according to an embodiment of the present invention.

Referring to FIG. 18, which is a schematic diagram of a basic logical structure of a user equipment provided by an embodiment of the present invention. For explanation, only portions related to the embodiment of the present invention are illustrated. The functional modules contained in the user equipment may be software modules, hardware modules or modules composed of both software and hardware, and include an acquiring module 1801, a determination module 1802 and a transmission module 1803.

The acquiring module 1801 is used for acquiring contention based user group numbers and a same contention based radio network temporary identifier CB-RNTI configured for multiple contention based user groups.

In the embodiment, the information includes CB-RNTI and CB user group number, and may further include partial schedule information required for transmitting the contention based uplink transmission such as one or more of modulation and coding scheme, power control command, size of frequency domain resource, resource allocation scheme, frequency hopping indication, cyclic shift indication, and pre-coding information and number of layers, the specific configuration method is described in the above method embodiment. In addition, the acquiring module 1801 may be used for acquiring CB user numbers.

The determination module 1802 is used for monitoring the CB Grant according to the CB-RNTI acquired by the acquiring module 1501 to determine the schedule information required by the CB uplink transmission, the schedule information mainly includes frequency domain resource of the CB uplink transmission.

The CB Grant includes several schedule domains, each schedule domain is used for indicating schedule information of a contention based user group, and the CB user group number corresponds to schedule domain number in the CB Grant.

In the embodiment, the CB Grant is used for scheduling the contention based uplink transmission, the information bit thereof is used for indicating the allocated uplink time-frequency domain resource information, and the redundancy bits may be used for indicating some other schedule information such as one or more of power control command, MCS, RV, frequency domain frequency modulation information and cyclic shift indication.

The transmission module 1803 is used for transmitting uplink data or reporting buffer status report by using the contention based uplink transmission resource determined by the determination module 1802 and granted by the CB Grant.

Figure 19:
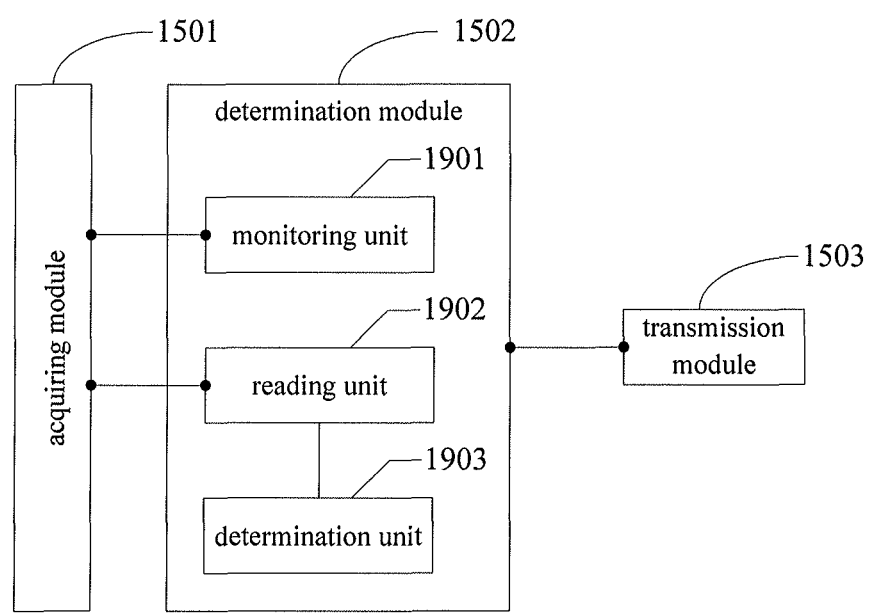
FIG. 19 is a schematic diagram of another basic logical structure of the user equipment according to an embodiment of the present invention.

The determination module 1802 shown in FIG. 18 may further include a monitoring unit 1901, a reading unit 1902 and a determination unit 1903, as shown in FIG. 19 which illustrates another basic logical structure of the user equipment provided by an embodiment of the present invention, where the monitoring unit 1901 is used for monitoring the CB Grant matched with the CB-RNTI according to the CB-RNTI acquired by the acquiring module 1801;

the reading unit 1902 is used for reading the schedule information indicated by the schedule domain corresponding to the CB user group number according to the CB user group number acquired by the acquiring module 1801;

the determination unit 1903 is used for determining available CB uplink transmission resource according to the schedule information read by the reading unit 1902.

Preferably, the determination unit 1903 is used for determining available contention based uplink transmission resource according to the acquired CB user number and the read schedule information if the CB user number is configured by the base station.

It should be noted that descriptions of information interactions and execution processes among the modules/units of the above devices are omitted since the device embodiments have a same concept and bring a same technical effect as the method embodiments of the present invention, the discuss thereof may refer to the method embodiments and thus is omitted.

It may be understood by those skilled in the art that all or part of the steps in the various methods of the above embodiments may be implemented by instructing hardware by program instructions, the program may be stored in a computer readable storage medium, the storage medium may include a Read Only Memory ((ROM) Read Only Memory), a Random Access Memory ((RAM) Random Access Memory), a disk, a disc and so on.

A detail description has been made to the method, configuration method and related device for contention based uplink transmission provided by the embodiments of the present invention, and the principle and embodiments of the present invention have been described by specific examples herein, the above description of the embodiments is merely used to facilitate understanding of the method and core idea of the present invention; meanwhile, those skilled in the art may amend the embodiments and application scope according to the idea of the present invention, and thus the content of the description should not limit the present invention.

What is claimed is:

1. A configuration method for contention based uplink transmission, comprising:
    configuring contention based user group numbers and configuring a same contention based radio network temporary identifier CB-RNTI for multiple contention based user groups; and
    configuring a same contention based uplink grant CB Grant for the multiple contention based user groups having the same CB-RNTI, wherein the CB Grant comprises multiple schedule domains, the contention based user group numbers respectively correspond to schedule domain numbers for identifying the schedule domains, the schedule domains indicate schedule information for allocating uplink frequency domain resources;
    wherein the CB Grant is carried on a common search space, and the number of information bits of the CB Grant is the same as the number of information bits of downlink control information of one of format 3/3A or format 1C.

2. The method of claim 1, wherein configuring the contention based user group numbers and configuring the same contention based radio network temporary identifier CB-RNTI for the multiple contention based user groups comprises:
    configuring the contention based user group number and configuring the same contention based radio network temporary identifier CB-RNTI for the multiple contention based user groups by using a higher layer signaling.

3. The method of claim 1, further comprising:
    configuring partial schedule information required by the contention based uplink transmission, the partial schedule information is one or more of modulation and coding scheme, power control command, size of frequency domain resource, resource allocation scheme, frequency hopping indication and cyclic shift indication.

4. The method of claim 1, wherein the redundancy bits of the schedule domain of the CB Grant are used for indicating one or more of virtual cyclic redundancy check, power control command, modulation and coding scheme, redundancy version, frequency domain frequency modulation information and cyclic shift indication, a channel state information request, resource allocation type, and
    precoding information and number of layers.

5. The method of claim 1, wherein allocating the uplink frequency domain resource comprises:
    allocating continuous frequency domain resource in the uplink frequency domain resource in a continuous frequency domain resource allocation manner, wherein indicating only a starting point of the continuous frequency domain resource in allocating; and/or
    allocating noncontinuous frequency domain resource in the uplink frequency domain resource in a noncontinuous frequency domain resource allocation manner, wherein limiting the number of noncontinuous frequency domain clusters in allocating, and indicating only a starting point of each of the noncontinuous frequency domain clusters.

6. The method of claim 5, wherein indicating only the starting point of the continuous frequency domain resource comprises:
    indicating one of all available starting points in the uplink frequency domain resource according to the size of frequency domain resource of a currently-configured transmission packet; or
    indicating one of all available starting points in the uplink frequency domain resource at an interval of several resource blocks according to a size of frequency domain resource of a currently-configured transmission packet; or
    indicating one of all available starting points in a portion of the uplink frequency domain resource according to a size of frequency domain resource of a currently-configured transmission packet; or
    indicating one of all available starting points in a portion of the uplink frequency domain resource at an interval of several resource blocks according to a size of frequency domain resource of a currently-configured transmission packet.

7. The method of claim 5, wherein indicating only the starting point of each of the noncontinuous frequency domain resource clusters comprises:
    indicating one of all available starting points in the uplink frequency domain resource according to the size of frequency domain resource of a currently-configured transmission packet; or
    indicating one of all available starting points in the uplink frequency domain resource at an interval of several resource blocks according to a size of frequency domain resource of a currently-configured transmission packet; or
    indicating one of all available starting points in a portion of the uplink frequency domain resource according to a size of frequency domain resource of a currently-configured transmission packet; or
    indicating one of all available starting points in a portion of the uplink frequency domain resource at an interval of several resource blocks according to a size of frequency domain resource of a currently-configured transmission packet.

8. A computer program product, comprising computer program code stored on a nontransitory storage medium, which, when executed by a computer unit, will cause the computer unit to perform the steps of a user terminal according to claim 1.

9. The method of claim 1, further comprising:
configuring a contention based user number for each of the contention based users in each of the contention based user groups by a dedicated radio resource control signaling.

10. The method of claim 9, further comprising:
each of the multiple schedule domains of the CB Grant further comprises a user indication domain, and the user indication domain is used for indicating the contention based user number in the contention based user group.

11. A method for contention based uplink transmission, comprising:
acquiring contention based user group numbers and a same contention based radio network temporary identifier CB-RNTI configured for multiple contention based user groups;
monitoring a contention based uplink grant CB Grant, according to the CB-RNTI, to determine schedule information required by the contention based uplink transmission, the schedule information comprises contention based uplink transmission resource, the CB Grant comprises several schedule domains, and the contention based user group numbers respectively correspond to schedule domain numbers used for identifying the schedule domains; and
transmitting uplink data or reporting buffer status report by using the contention based uplink transmission resource granted by the CB Grant according to the determined schedule information required by the contention based uplink transmission;
wherein the CB Grant is carried on a common search space, and the number of information bits of the CB Grant is the same as the number of information bits of downlink control information of one of format 3/3A or format 1C.

12. The method of claim 11, further comprising:
acquiring partial schedule information, the partial schedule information is one or more of modulation and coding scheme, power control command, size of frequency domain resource, resource allocation scheme, frequency hopping indication and cyclic shift indication.

13. The method of claim 11, wherein monitoring the contention based uplink grant CB Grant to determine the schedule information required by the contention based uplink transmission comprises:
monitoring the CB Grant matched with the CB-RNTI according to the acquired CB-RNTI;
reading schedule information indicated by the schedule domain of the CB Grant corresponding to the contention based user group number according to the acquired contention based user group number; and
determining available contention based uplink transmission resource according to the read schedule information.

14. The method of claim 13, further comprising:
acquiring a contention based user number by receiving a dedicated radio resource control signaling.

15. The method of claim 13, wherein monitoring the contention based uplink grant CB Grant to determine the schedule information required by the contention based uplink transmission comprises:
monitoring the CB Grant matched with the CB-RNTI according to the acquired CB-RNTI;
reading schedule information indicated by the schedule domain of the CB Grant corresponding to the contention based user group number according to the acquired contention based user group number; and
determining available contention based uplink transmission resource according to the acquired contention based user number and the read schedule information.

16. A base station, comprising:
a processor configured to configure contention based user group numbers and configure a same contention based radio network temporary identifier CB-RNTI for multiple contention based user groups; and
the processor configured to configure a same contention based uplink grant CB Grant for the multiple contention based user groups having the same CB-RNTI configured by the processor, the CB Grant comprises multiple schedule domains, the contention based user group numbers configured by the processor respectively correspond to schedule domain numbers for identifying the schedule domains of the CB Grant configured by the processor, the schedule domains indicate schedule information for allocating uplink frequency domain resource;
wherein the CB Grant is carried on a common search space, and the number of information bits of the CB Grant is the same as the number of information bits of downlink control information of one of format 3/3A or format 1C.

17. The base station of claim 16, wherein
the processor is further configured to configure the contention based user group numbers and configure the same contention based radio network temporary identifier CB-RNTI for the multiple contention based user groups by using a higher layer signaling.

18. The base station of claim 16, wherein
the processor is further configured to configure partial schedule information required by the contention based uplink transmission, the partial schedule information is one or more of modulation and coding scheme, power control command, size of frequency domain resource, resource allocation scheme, frequency hopping indication and cyclic shift indication.

19. The base station of claim 16, wherein the processor is further configured to: allocate continuous frequency domain resource in the uplink frequency domain resource in a continuous frequency domain resource allocation manner, and indicate only a starting point of the continuous frequency domain resource in allocating; and/or
allocate noncontinuous frequency domain resource in the uplink frequency domain resource in a noncontinuous frequency domain resource allocation manner, limit the number of noncontinuous frequency domain clusters and indicate only starting points of the noncontinuous frequency domain clusters in allocating.

20. The base station of claim 19, wherein the processor is further configured to:
indicate one of all available starting points in the uplink frequency domain resource according to a size of frequency domain resource of a currently-configured transmission packet; or
indicate one of all available starting points in the uplink frequency domain resource at an interval of several resource blocks according to a size of frequency domain resource of a currently-configured transmission packet; or
indicate one of all available starting points in a portion of the uplink frequency domain resource according to a size of frequency domain resource of a currently-configured transmission packet; or
indicate one of all available starting points in a portion of the uplink frequency domain resource at an interval of several resource blocks according to a size of frequency domain resource of a currently-configured transmission packet.

21. The base station of claim 19, wherein the processor is further configured to:
indicate one of all available starting points in the uplink frequency domain resource according to a size of frequency domain resource of a currently-configured transmission packet; or
indicate one of all available starting points in the uplink frequency domain resource at an interval of several resource blocks according to a size of frequency domain resource of a currently-configured transmission packet; or
indicate one of all available starting points in a portion of the uplink frequency domain resource according to a size of frequency domain resource of a currently-configured transmission packet; or
indicate one of all available starting points in a portion of the uplink frequency domain resource at an interval of several resource blocks according to a size of frequency domain resource of a currently-configured transmission packet.

22. The base station of claim 16, wherein
the processor configures the redundancy bits of the same CB Grant to indicate one or more of virtual cyclic redundancy check, power control command, modulation and coding scheme, redundancy version, frequency domain frequency modulation information and cyclic shift indication.

23. The base station of claim 22, wherein the processor is further configured to configure a contention based user number for each of the contention based user in each of the contention based user group by a dedicated radio resource control signaling.

24. The base station of claim 23, wherein
each of the multiple schedule domains of the CB Grant further comprises a user indication domain, and the user indication domain is used for indicating the contention based user number in the contention based user group.

25. A user equipment, comprising:
an processor configured to acquire contention based user group numbers and a same contention based radio network temporary identifier CB-RNTI configured for multiple contention based user groups;
the processor configured to monitor a contention based uplink grant CB Grant according to the CB-RNTI acquired by the processor to determine schedule information required by the contention based uplink transmission, the schedule information comprises contention based uplink transmission resource, the monitored CB Grant comprises several schedule domains, the contention based user group numbers acquired by the processor respectively correspond to schedule domain numbers for identifying the schedule domains of the CB Grant monitored by the processor;
a transmitter configured to transmit uplink data or report buffer status report by using the contention based uplink transmission resource granted by the CB Grant, the contention based uplink transmission resource is in the schedule information determined;
wherein the CB Grant is carried on a common search space, and the number of information bits of the CB Grant is the same as the number of information bits of downlink control information of one of format 3/3A or format 1C.

26. The user equipment of claim 25, wherein the processor is further configured to:
monitor the CB Grant matched with the CB-RNTI according to the CB-RNTI acquired by the acquiring module;
read schedule information indicated by the schedule domain of the CB Grant monitored according to the contention based user group number acquired by the acquiring module, wherein the schedule domain corresponds to the contention based user group number; and
determine available contention based uplink transmission resource according to the schedule information read.

\* \* \* \* \*